United States Patent
Saito

(10) Patent No.: US 9,256,385 B2
(45) Date of Patent: Feb. 9, 2016

(54) RELAY DEVICE AND IMAGE PROCESSING DEVICE CAPABLE OF EXECUTING SELECTED IMAGE PROCESSING USING SELECTED APPLICATION TYPES

(71) Applicant: BROTHER KOGYO KABUSHIKI KAISHA, Nagoya-shi, Aichi-ken (JP)

(72) Inventor: Ken Saito, Tokoname (JP)

(73) Assignee: BROTHER KOGYO KABUSHIKI KAISHA, Nagoya-Shi, Aichi-Ken (JP)

(*) Notice: Subject to any disclaimer, the term of this patent is extended or adjusted under 35 U.S.C. 154(b) by 0 days.

(21) Appl. No.: 14/465,958

(22) Filed: Aug. 22, 2014

(65) Prior Publication Data

US 2015/0055177 A1  Feb. 26, 2015

(30) Foreign Application Priority Data

Aug. 23, 2013  (JP) ................................. 2013-173395

(51) Int. Cl.
*G06F 3/12*  (2006.01)
(52) U.S. Cl.
CPC ............ *G06F 3/1206* (2013.01); *G06F 3/1257* (2013.01); *G06F 3/1258* (2013.01); *G06F 3/1288* (2013.01)
(58) Field of Classification Search
None
See application file for complete search history.

(56) References Cited

U.S. PATENT DOCUMENTS

2011/0299111 A1* 12/2011 Hasegawa ..................... 358/1.15
2011/0310408 A1* 12/2011 Saito .............................. 358/1.9

FOREIGN PATENT DOCUMENTS

JP  2008-229993 A  10/2008

* cited by examiner

*Primary Examiner* — Benny Q Tieu
*Assistant Examiner* — Haris Sabah
(74) *Attorney, Agent, or Firm* — Merchant & Gould PC

(57) ABSTRACT

A relay device may receive, from a image processing device, selected image processing identifying information configured to identify a selected image processing. A plural types of image processing may be a processing to be executed on first image information outputted from the image processing device. The relay device may receive, from the image processing device, selected second image information-identifying information configured to identify selected second image information selected in the image processing device. The relay device may receive the selected second image information identified by the selected second image information-identifying information. The relay device may execute the selected image processing identified by the selected image processing identifying information to compose the selected second image information and the first image information. The relay device may send, to the image processing device, created image information created by the execution of the selected image processing.

20 Claims, 8 Drawing Sheets

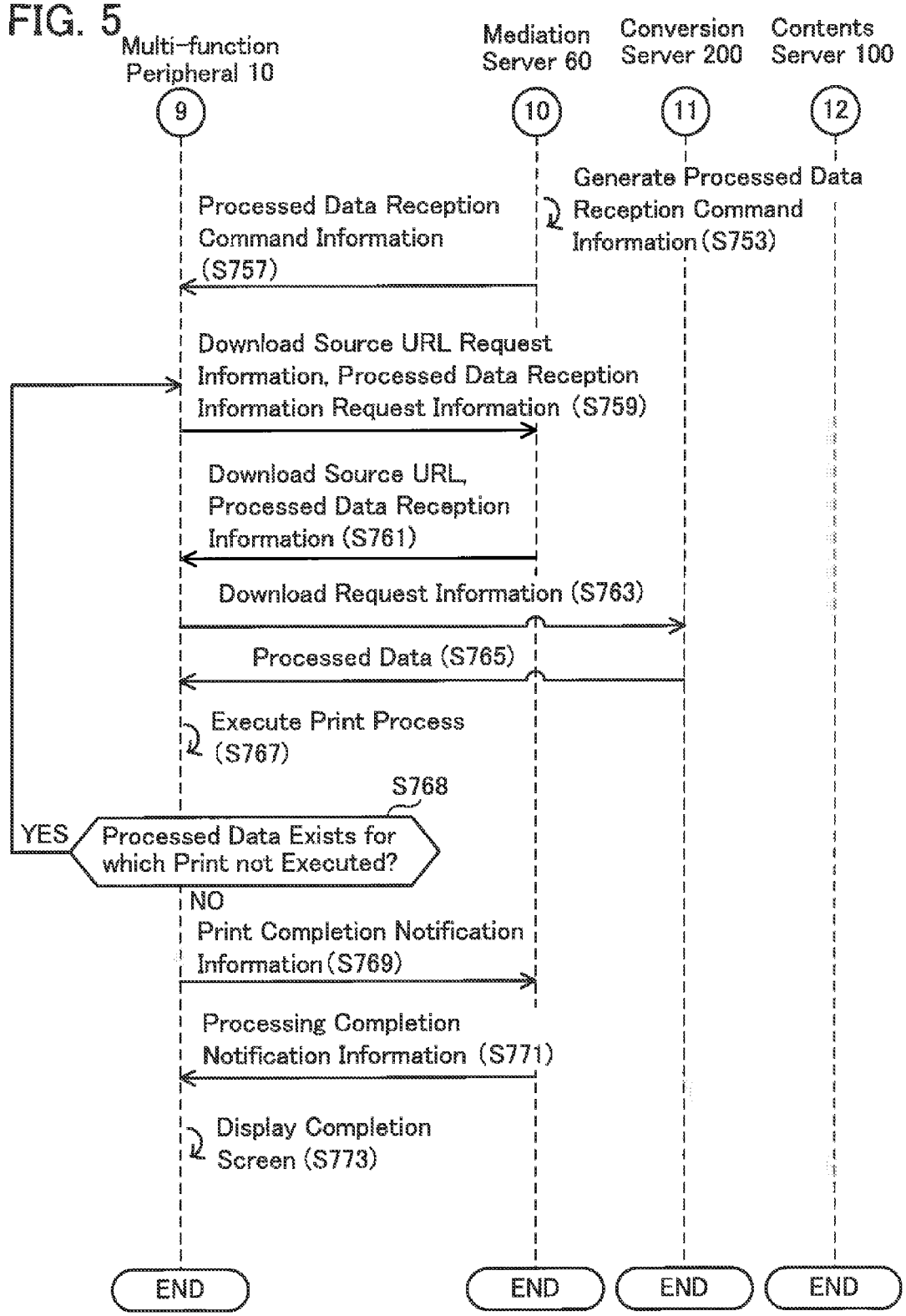

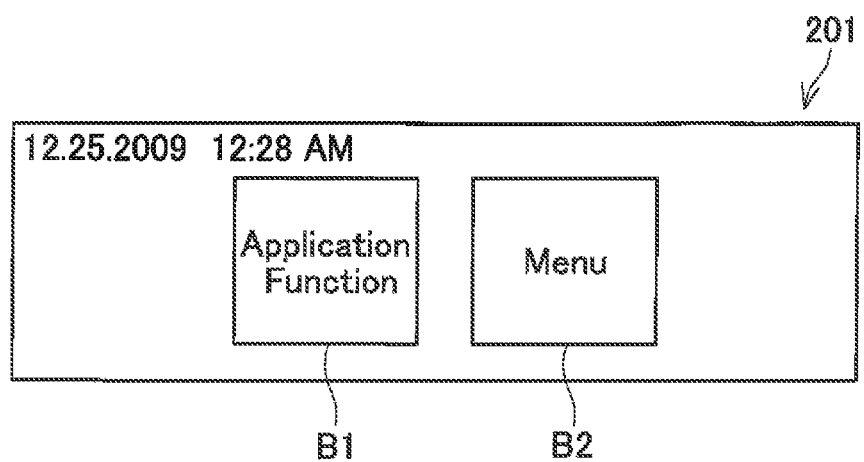
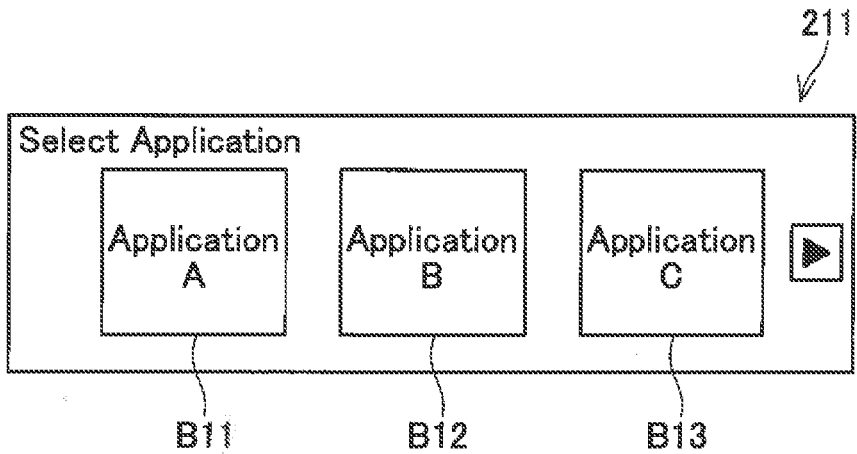
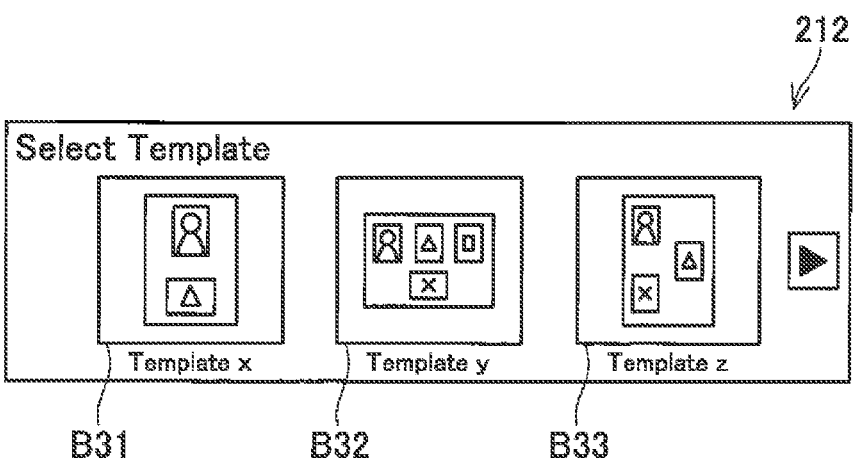

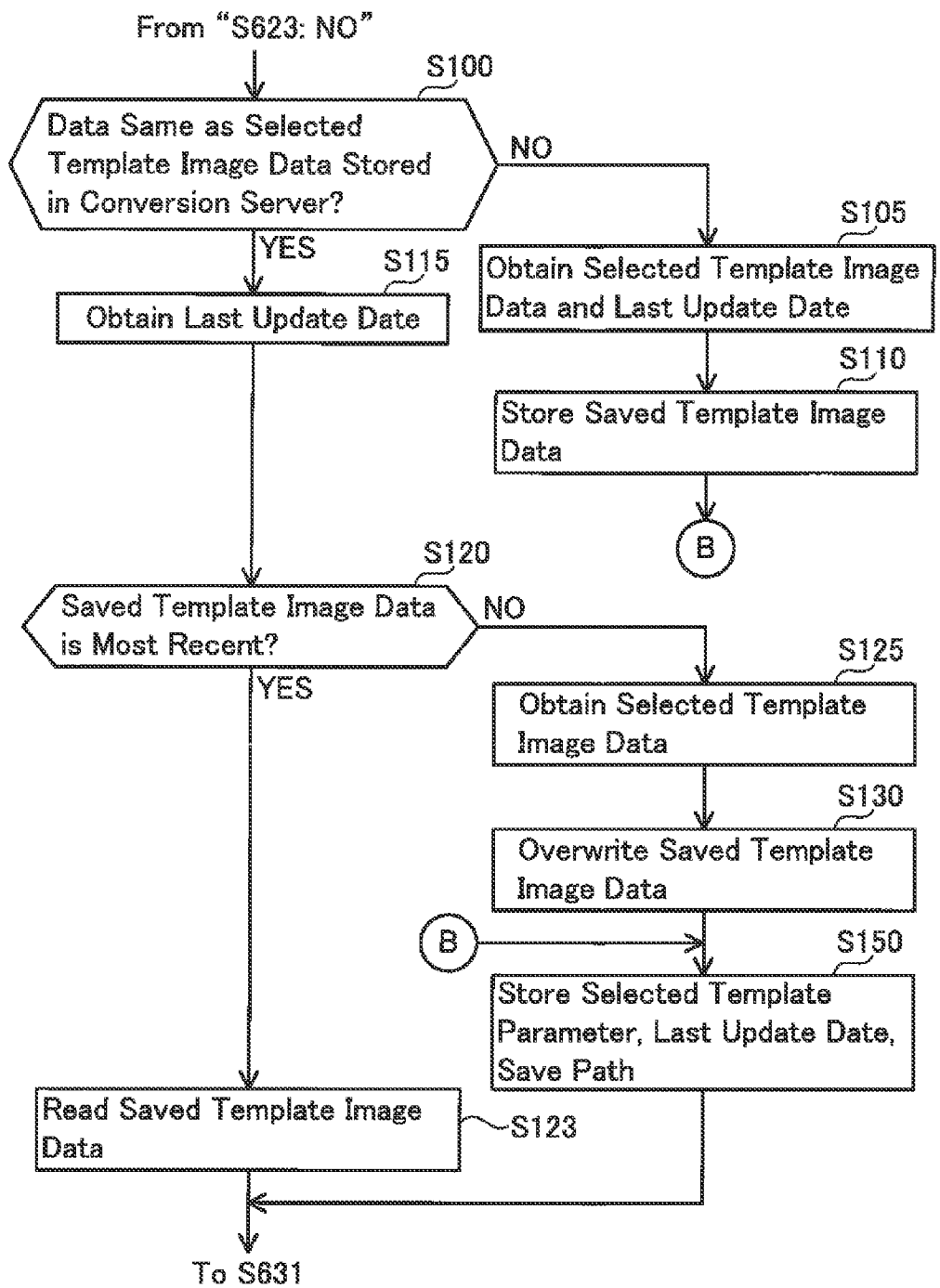

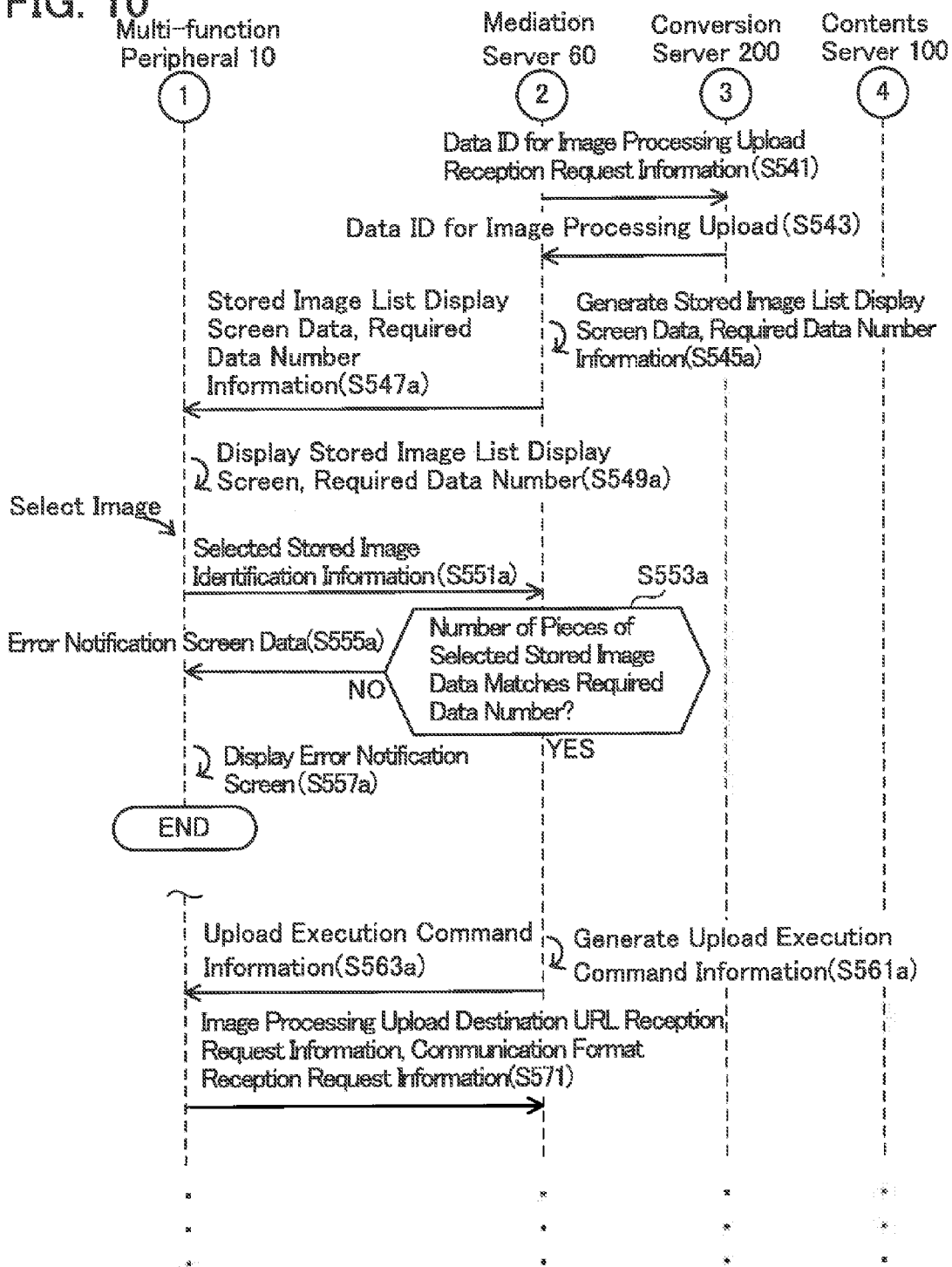

RELAY DEVICE AND IMAGE PROCESSING DEVICE CAPABLE OF EXECUTING SELECTED IMAGE PROCESSING USING SELECTED APPLICATION TYPES

CROSS-REFERENCE TO RELATED APPLICATION

This application claims priority to Japanese Patent Application No. 2013-173395, filed on Aug. 23, 2013, the contents of which are hereby incorporated by reference into the present application.

TECHNICAL FIELD

The present specification discloses a relaying device connected with an image processing device via a network.

DESCRIPTION OF RELATED ART

A known image processing device has a web browser integrated therein, and has a function for downloading and printing a web page. Further, the image processing device has a function for sending scan data, which was created by scanning a document which has a Joint Photographic Experts Group (referred to as JPEG) format, to a web server without performing any processing.

SUMMARY

A processing system is required which is capable of executing image processing more complex than simple format conversion or the like on image data output from an image processing device.

In one aspect of the teachings disclosed herein, a relay device may be provided. The relay device may comprise: a network interface configured to connect with a network; a processor coupled to the network interface; and a memory storing computer-readable instructions and one or more processing modules. When executed by the processor, the computer-readable instructions may cause the relay device to perform receiving, via the network interface, selected image processing identifying information from a image processing device which is connected with the network. The selected image processing identifying information may be configured to identify a selected image processing, which is at least one type of image processing selected in the image processing device from among plural types of image processing. The plural types of image processing may be a processing to be executed on first image information outputted from the image processing device. The computer-readable instructions may cause the relay device to perform receiving selected second image information-identifying information from the image processing device via the network interface. The selected second image information-identifying information may be configured to identify selected second image information selected in the image processing device from among a plurality of second image information. The selected second image information may be information to be composed with the first image information by the selected image processing. The computer-readable instructions may cause the relay device to perform receiving the selected second image information identified by the selected second image information-identifying information. The computer-readable instructions may cause the relay device to perform executing the selected image processing identified by the selected image processing identifying information to compose the selected second image information and the first image information by using one or more of the processing modules. The computer-readable instructions may cause the relay device to perform sending created image information to the image processing device via the network interface. The created image information may be image information created by the execution of the selected image processing.

BRIEF DESCRIPTION OF THE DRAWINGS

FIG. 5 shows a sequence diagram of various processing executed by each device;

FIG. 6 shows an example of a main screen display;

FIG. 7 shows an example of an application selection screen display;

FIG. 8 shows an example of a template selection screen display;

FIG. 9 shows a flowchart illustrating processing contents of a first variant; and FIG. 10 shows a sequence diagram of various processing executed by each device.

EMBODIMENT

System Configuration

Figure 1:
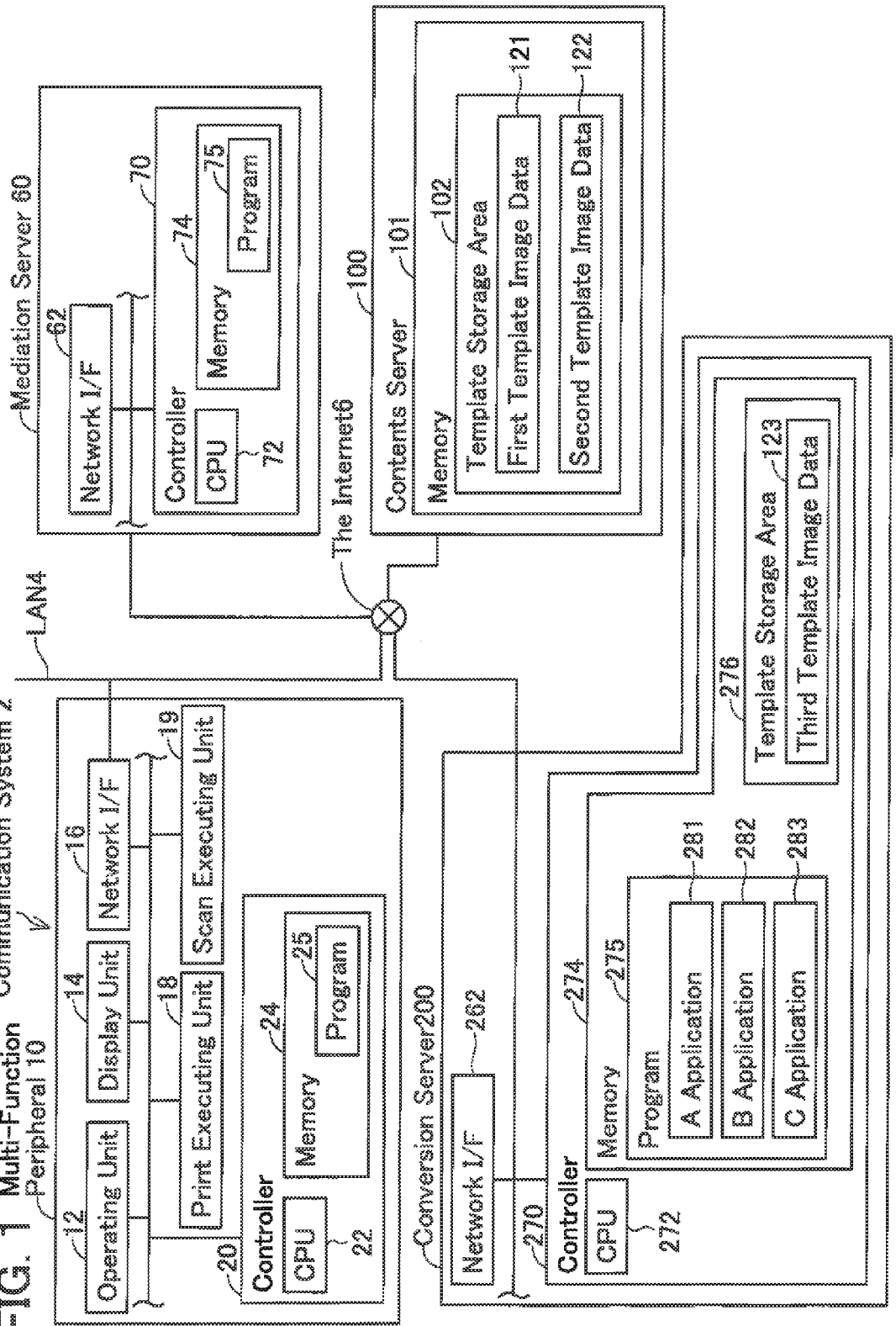
FIG. 1 shows the configuration of a communication system.
Figure 2:
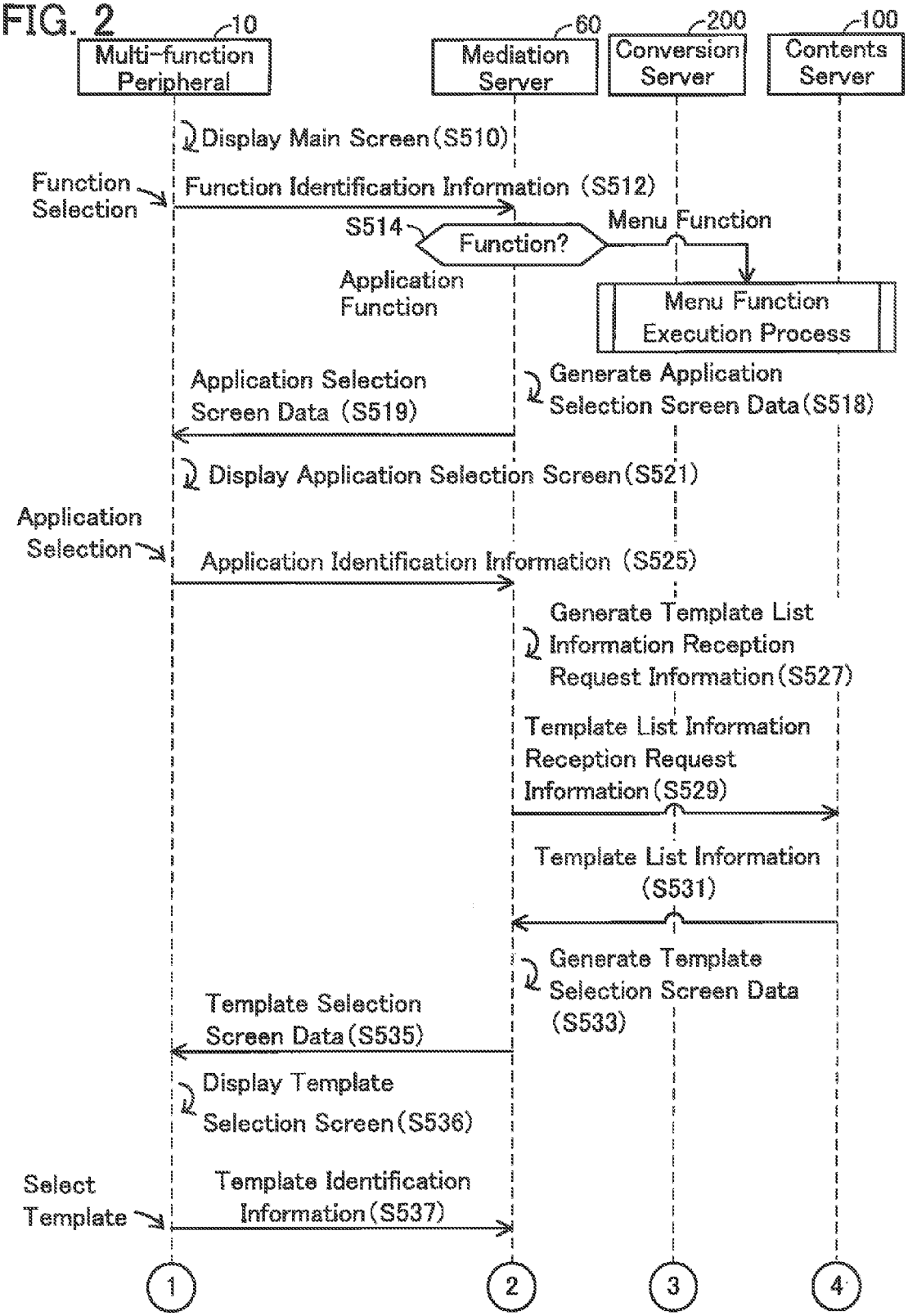
FIG. 2 shows a sequence diagram of various processing executed by each device.
Figure 3:
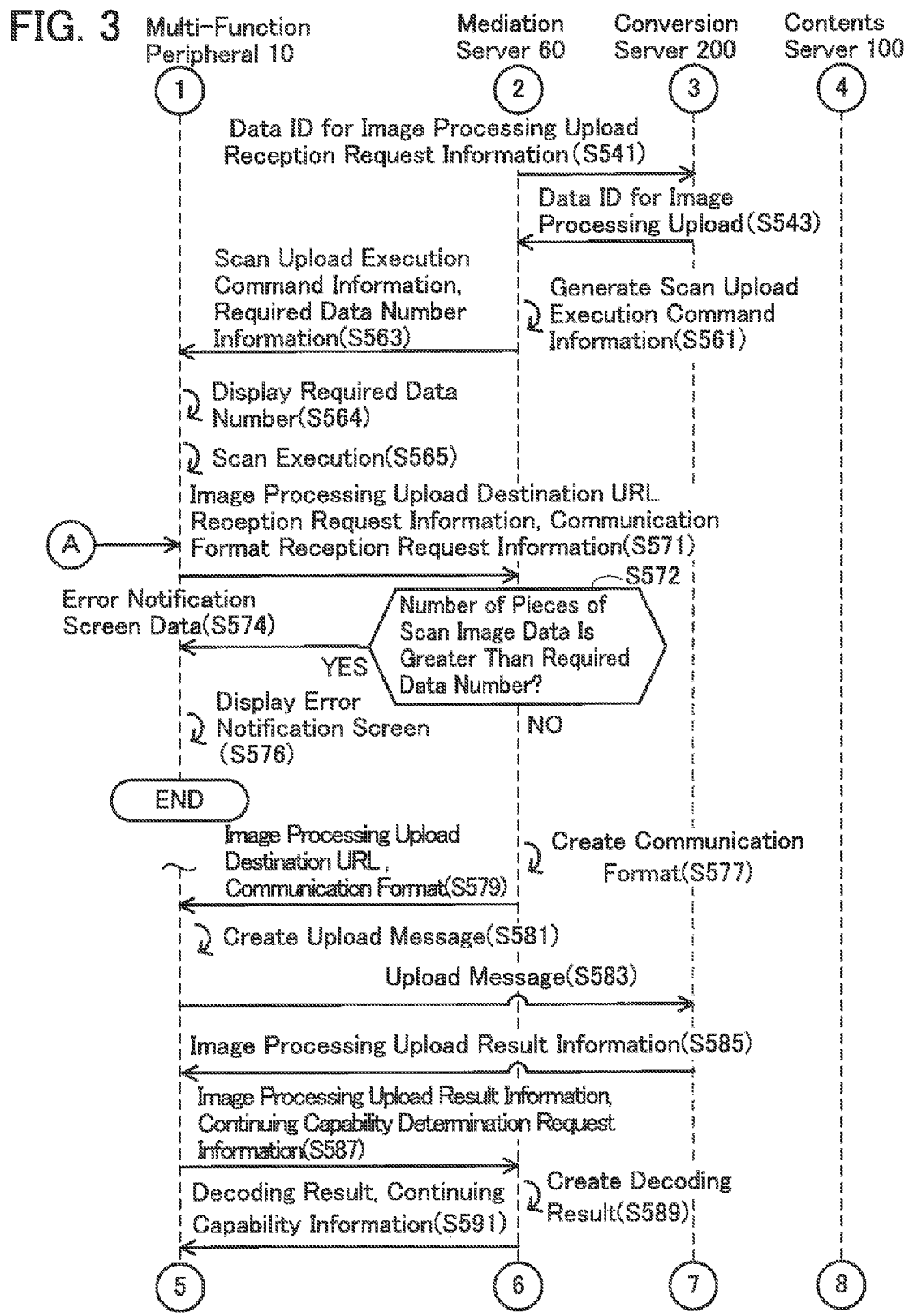
FIG. 3 shows a sequence diagram of various processing executed by each device.
Figure 4:
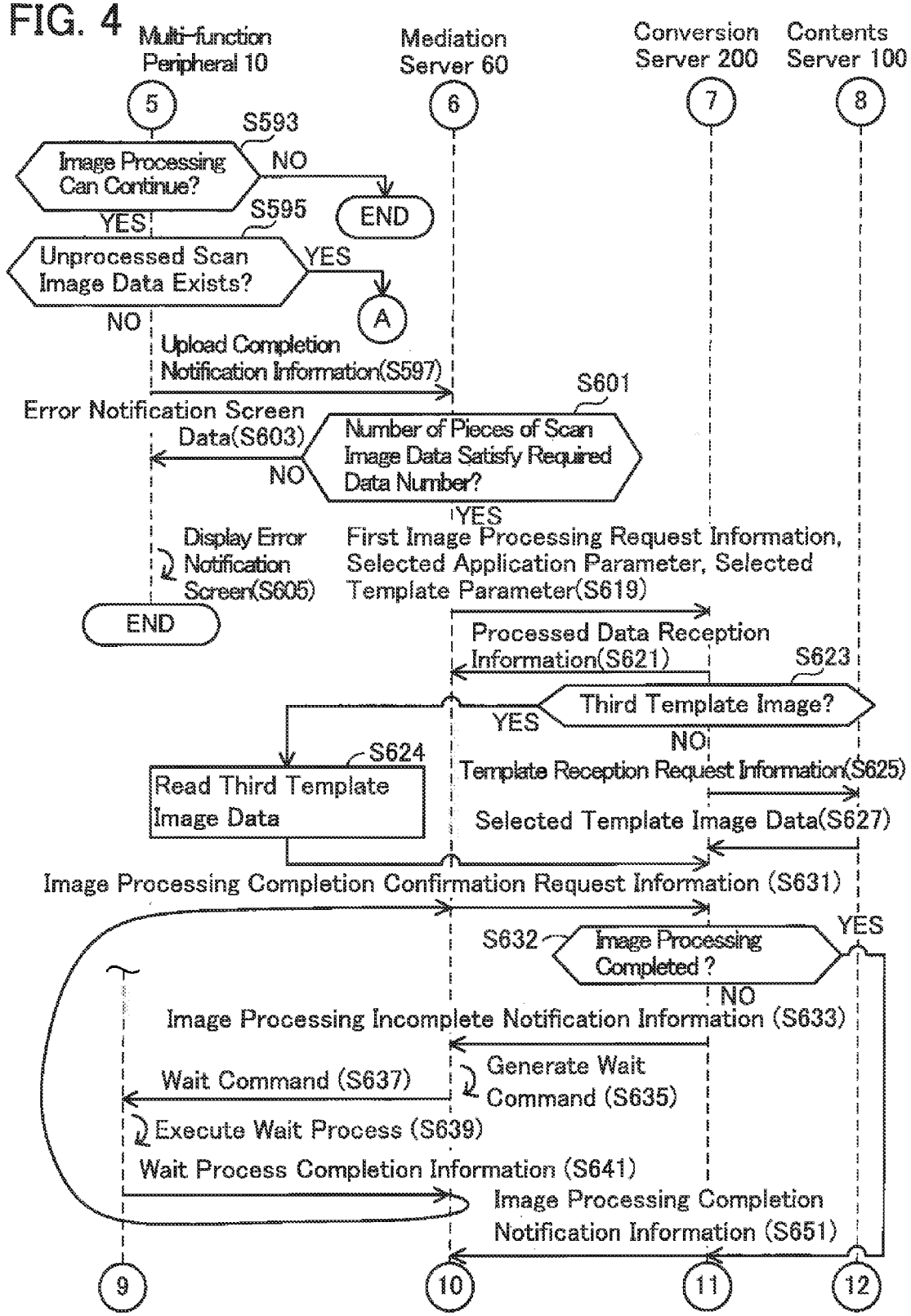
FIG. 4 shows a sequence diagram of various processing executed by each device.

As shown in FIG. 1, a communication system 2 includes a multi-function peripheral 10, a mediation server 60, contents server 100, and a conversion server 200. The multi-function peripheral 10 is connected with the Internet 6 via a LAN 4. The mediation server 60, the contents server 100, and conversion server 200 are connected with the Internet 6.

The multi-function peripheral 10, the mediation server 60, and the conversion server 200 perform communication by, e.g., HTTP (referred to as HyperText Transfer Protocol) or HTTPS (referred to as HyperText Transfer Protocol Secure). More specifically, the multi-function peripheral 10 operates as a HTTP client. The conversion server 200 operates as a HTTP server. On the other hand, the mediation server 60 operates as a HTTP server in communication with the multi-function peripheral 10, and operates as a HTTP client in communication with the conversion server 200, thereby being capable of executing communication with the multi-function peripheral 10 and communication with the conversion server 200 without being obstructed by a firewall or the like provided in the LAN 4, etc.

(Structure of Multi-Function Peripheral 10)

The multi-function peripheral 10 may execute a Printing function, a Scan function, a Copy function, a FAX function, or the like. The multi-function peripheral 10 comprises an operating unit 12, a display unit 14, a network interface (described as "I/F," hereinafter) 16, a print executing unit 18, a scan executing unit 19, and a controller 20. The operating unit 12 has a plurality of keys. A user can input various instructions to the multi-function peripheral 10 by operating the operating unit 12. The display unit 14 is a display for displaying various pieces of information. The network I/F 16 is connected to the LAN 4. The multi-function peripheral 10 is capable of communicating with the mediation server 60, the conversion server 200, etc. via the network I/F 16. The print executing unit 18 comprises an inkjet or laser printing mechanism. The scan executing unit 19 comprises a scan mechanism such as a CCD or CIS. The controller 20 comprises a CPU 22 and a memory 24. The CPU 22 executes various processes in accordance with program 25 stored in the memory 24. The memory 24 may be a computer readable storage medium. The computer readable storage medium is a non-transitory medium, such as a ROM, RAM, flash memory, hard disk, etc. An electrical signal carrying a program to be downloaded from a server, etc. on the Internet is not included in the non-transitory medium.

(Structure of Mediation Server 60)

The mediation server 60 is a server independent of the conversion server 200 and the contents server 100. The mediation server 60 is a server for mediating communication of various data between the conversion server 200 and the multi-function peripheral 10. The mediation server 60 is a server provided by a vendor or a manufacturer of the multi-function peripheral 10. The mediation server 60 includes a network I/F 62 and a controller 70. The mediation server 60 is capable of communicating with the multi-function peripheral 10, the contents server 100, the conversion server 200, etc. via the network I/F 62. The controller 70 comprises a CPU 72 and a memory 74. A program 75 is stored in the memory 74. The CPU 72 executes various processes in accordance with the program 75. As with the memory 24, the memory 74 may be a computer readable storage medium.

(Structure of the Conversion Server 200)

The conversion server 200 is a server configured as a separate entity from the mediation server 60 and the contents server 100. The conversion server 200 executes conversion processing, described below, of data of various types. The conversion server 200 may be a server which is provided to a vendor of the multi-function peripheral 10. The conversion server 200 comprises a network interface 262 and a controller 270. The controller 270 comprises a CPU 272 and memory 274. A program 275 and a template storage area 276 are stored in the memory 274. The CPU 272 executes various processes in accordance with the program 275. Third template image data 123 is stored in the template storage area 276. The third template image data 123 is data for displaying each of a plurality of third template images, to be described. As with the memory 24, the memory 274 may be a computer readable storage medium.

The program 275 includes an A application 281, a B application 282, and a C application 283 as programs for executing image processing.

The A application 281 is an application for executing a process of synthesizing an output image output from the multi-function peripheral 10, and a first template image for the A application. Specifically, the output image is synthesized in a specific field (e.g., a transmission field) included in the first template image. In the image processing executed in the A application 281, the number of output images required is one.

The B application 282 is an application for executing a process of synthesizing an output image output from the multi-function peripheral 10, and a second template image for the B application. Specifically, the output image is synthesized so as to be placed in each of a predetermined number of one or more specific fields (e.g., image placing locations) included in the second template image. In the image processing executed in the B application 282, the number of output images required matches the predetermined number of specific fields.

The C application 283 is an application for executing a process of synthesizing an output image output from the multi-function peripheral 10, and a third template image for the C application. Specifically, the third template image is synthesized so as to be placed in a specific field (e.g., a location filled black) of the output image output from the multi-function peripheral 10. The third template image may be a pattern image having a constant pattern.

In the image processing executed in the C application 283, the number of output images required is one.

(Structure of Contents Server 100)

The contents server 100 is a server independent of the mediation server 60 and the conversion server 200. The contents server 100 may be a server provided by the vendor of the multi-function peripheral 10. The contents server 100 comprises a memory 101. A template storage area 102 is stored in the memory 101. First template image data 121 and second template image data 122 are stored in the template storage area 102. The first template image data 121 is data for displaying the first template image described above. The second template image data 122 is data for displaying the second template image described above.

The first template image data 121 and the second template image data 122 are stored in the template storage area 102 of the contents server 100. On the other hand, the third template image data 123 is stored in the memory 274 of the conversion server 200. The reason for this is as follows. When executing an editing operation or maintenance on a template image stored in the conversion server 200, the image processing executed by the conversion server 200 may be affected. As described above, the third template image data 123 may be a pattern image. Consequently, the frequency of executing the editing operation, etc. for the third template image data 123 can be reduced compared to the first template image data 121 and the second template image data 122. Hence, the third template image data 123 can be stored in the memory 274 of the conversion server 200. Further, by storing the first template image data 121 and the second template image data 122 in the contents server 100, it is possible to prevent the first template image data 121 and the second template image data 122, which undergo the editing operation, etc. at a high frequency, from being affected by the image processing executed by the mediation server 60 or the conversion server 200.

When the A application 281 and the B application 282 are executed, selected template image data must be obtained from the contents server 100 in S625, to be described. On the other hand, when the C application 283 is executed, it is not necessary to obtain the selected template image data from the contents server 100, since the selected template image data may be read from the memory 274 in S624, to be described.

Some features relating to the description in the present specification are hereby explained. In the present specification, the description "the CPU 72 of the mediation server 60 receives various information" includes the technical meaning "the CPU 72 of the mediation server 60 receives various information via the network interface 62". Further, the description "the CPU 72 of the mediation server 60 sends various information" includes the technical meaning "the CPU 72 of the mediation server 60 outputs various information via the network interface 62". Similar features exist regarding the CPU 272 of the conversion server 200 and the network interface 262. Similar features exist regarding the CPU 22 of the multi-function peripheral 10 and the network interface 16.

Here, a definition of the words "data" and "information" will be explained. In the present specification, "information"

is used as a concept superordinate to "data". Consequently, "A data" may be rephrased as "A information". Further, even if the "information" has a different format as "data" (e.g., text format, binary format, flag format, etc.), this is treated as the same information as long as it is recognized that the meaning is the same. For example, as long as the device treats this as information indicating that the number of print copies is two parts, data of the text format "COPY=2", and data of the binary format "10" is the same information.

In the present specification, a case is explained in which the mediation server 60, conversion server 200 and contents server 100 are connected by the Internet 6 (that is, when a device functioning as the mediation server 60, a device functioning as the conversion server 200 and a device functioning as the contents server 100 are disposed at physically distant positions), but other configurations are possible. The mediation server 60, conversion server 200 and contents server 100 may be realized as a single server. In this case, in the single server, a program which functions as the mediation server 60 and a program which functions as the conversion server 200 run, and communication between the programs is performed via a bus in the server. When the mediation server 60 and conversion server 200 are realized as a single server, in the present specification, communication which is explained as communication between the mediation server 60 and the conversion server 200 may be taken to mean communication between the program which functions as the mediation server 60 and the program which functions as the conversion server 200. Further, a configuration may be realized in which a program which functions as the mediation server 60, and moreover also functions as the conversion server 200, runs on a single server. In this case, in the present specification, communication which is explained as communication between the mediation server 60 and the conversion server 200 may replaced with passing of data within the program which functions as the mediation server 60 and which moreover functions as the conversion server 200.

(Operation of Communication System)

Operation of the communication system 2 will be described using sequence diagrams of FIGS. 2 to 5. In receiving a command for displaying a main screen, the CPU 22 of the multi-function peripheral 10 cause the display unit 14 to display the main screen in S510. The command for displaying the main screen may be input from the operating unit 12 by a user. Data for displaying the main screen may be preliminarily stored in the memory 24. An example of the main screen 201 is shown in FIG. 6. The main screen 201 includes button images B1 and B2. The button images B1 and B2 are images for receiving an input of an execution instruction among a plurality of functions. A function received by the button image B1 is an application function. The application function is a function that performs applied processing, such as a process for generating an image for an address side or back side of a postcard. A function received by the button image B2 is a menu function. The menu function is a function that performs processing for executing various settings of the multi-function peripheral 10.

When an operation of selecting the button image B1 or B2 is executed in the multi-function peripheral 10, in S512 the CPU 22 sends function identification information to the mediation server 60. The function identification information is information indicating a function associated with the selected button image. An example of the function identification information is "application function", which is the name of the button image B1. That is, the function identification information may be information indicating the selected button.

When receiving the function identification information from the multi-function peripheral 10, in S514 the CPU 72 of the mediation server 60 determines the function indicated by the function identification information.

When the menu function is indicated (S514: menu function), a menu function execution process is executed. Processing contents of the menu function execution process will be omitted. On the other hand, when the application function is indicated (S514: application function), the process proceeds to S518.

In S518, the CPU 72 specifies an application selection screen 211 as the screen data to be sent next to the multi-function peripheral 10. The application selection screen 211 is a screen for receiving selection of one or more applications among the plurality of the application functions.

In S518, the CPU 72 of the mediation server 60 generates application selection screen data for causing the application selection screen 211 to be displayed. Information (not shown) indicating which type of information should be included in the application selection screen data is stored in the memory 74. The CPU 72 of the mediation server 60 generates the application selection screen data according to this information. The following is included in the application selection screen data: information indicating that button images B11 to B13 are included in the application selection screen 211; information indicating that a screen for selecting one of the button images B11 to B13 is displayed; information indicating that "A aplication", "B application", "C application" correspond respectively to the respective button images B11 to B13; and information indicating a character string to be attached to the button images B11 to B13 and displayed. In S519, the CPU 72 of the mediation server 60 sends the application selection screen data to the multi-function peripheral 10.

In receiving the application selection screen data from the mediation server 60, in S521 the CPU 22 of the multi-function peripheral 10 causes the application selection screen 211 to be displayed on the display unit 14. As shown in FIG. 7, the application selection screen 211 includes the button images B11 to B13. Each of the button images B11 to B13 is an image for receiving selection of the application functions of each of the A to C applications.

Moreover, information for accessing bitmap information for displaying an image of the button images B11 to B13 is included in the application selection screen data received from the mediation server 60. Based on this information, the CPU 22 obtains the bitmap information from the mediation server 60, and causes the application selection screen 211 to be displayed on the display unit 14. Consequently, it is not necessary to include the bitmap information for displaying an image of the button images B11 to B13 in the application selection screen data. The user operates the operating unit 12 to select a button image representing a desired application from the application selection screen 211.

When the operation of selecting the button image in the multi-function peripheral 10 is performed, in S525 the CPU 22 of the multi-function peripheral 10 sends application identification information to the mediation server 60. The application identification information is information for identifying a selected application, which is the application selected by the user. An example of the application identification information is the name of the application function. That is, the application identification information may be information indicating the selected button.

In S527, the CPU 72 identifies the selected application based on the application identification information, and generates template list information reception request information corresponding to the selected application. The template list information reception request information is information for requesting template list information to the contents server 100, the template list information being information needed for causing a list of template images corresponding to the selected application to be displayed. For example, when the selected application is the A application 281, the template list information for causing a list of the first template images to be displayed is requested to the contents server 100. Further, for example, when the selected application is the C application 283, the template list information for causing a list of the third template images to be displayed is requested to the contents server 100. In S529, the CPU 72 sends the template list information reception request information to the contents server 100. In S531, the CPU 72 receives the template list information sent from the contents server 100.

In S533, the CPU 72 generates template selection screen data for causing a template selection screen 212 to be displayed. The template selection screen data is data for causing the template selection screen 212 to be displayed on the display unit 14. The template selection screen 212 is a screen for listing template images corresponding to the selected application, and for receiving selection of one template image. Hereafter, the template image selected by the user will be described as a selected template image. The template selection screen data is generated based on the template list information received in S531. In S535, the CPU 72 sends the template selection screen data to the multi-function peripheral 10.

When receiving the template selection screen data from the mediation server 60, in S536 the CPU 22 of the multi-function peripheral 10 causes the template selection screen 212 to be displayed on the display unit 14. FIG. 8 shows an example of the template selection screen 212. The template selection screen 212 includes thumbnail images B31 to B33. The thumbnail images B31 to B33 are each an image for receiving selection of each of templates x to z. For example, when the selected application is the A application, the thumbnail images B31 to B33 are thumbnail images of the first template images used in the A application. Further, when the selected application is the B application, the thumbnail images B31 to B33 are thumbnail images of the second template images used in the B application. Moreover, when the selected application is the B application, the number of specific fields included in each of the plurality of second template images may be different. Consequently, the number of scan images required may be different according to which of the second template images is selected.

The user operates the operating unit 12 to select, from among the plurality of thumbnail images, a thumbnail image corresponding to the template image to be used. Thus, the selection of the selected template image is executed. In the present embodiment, the description will continue using as an example a case that the user selects the thumbnail image B31 (i.e., template x). In S537, the CPU 22 sends template identification information for identifying the selected template image to the mediation server. In the illustrative example of the present embodiment, template identification information including a template name "template x" is sent image to the mediation server. That is, the template identification information may be information indicating the selected thumbnail image.

In S541, the CPU 72 of the mediation server 60 sends data ID for image processing upload reception request information to the conversion server 200. The data ID for image processing upload reception request information is information for requesting, to the conversion server 200, "data ID for image processing upload" for identifying upload data uploaded to the conversion server 200. In S543, the CPU 272 of the conversion server 200 sends "the data ID for image processing upload" to the mediation server 60.

In S561, the CPU 72 of the mediation server 60 generates scan upload execution command information. The scan upload execution command information is information commanding the multi-function peripheral 10 to execute uploading to the conversion server 200 of upload data generated by a scan process. In S563, the CPU 72 sends the scan upload execution command information and required data number information to the multi-function peripheral 10. The required data number information is information indicating the number of pieces of scan image data required when the selected application is performed and image processing is executed by the conversion server 200. The required data number is a value determined by type of application and type of template. Specifically, when the selected application is the A or C application, the required data number is one. On the other hand, when the selected application is the B application, the required data number is a predetermined number of the specific fields included in the selected template image. That is, the required data number can be determined based on the selected template image identified by the template identification information received in S537. In S564, the CPU 22 of the multi-function peripheral 10 causes the required data number to be displayed on the display unit 14. The display mode of the required data number may be in the manner of, e.g., "Please set OO documents".

In S565, the CPU 22 of the multi-function peripheral 10 executes a scan of an image. Specifically, the user sets a paper, on which a prescribed image has been recorded, on the scan executing unit 19, and presses a start reading button of the operating unit 12, whereupon the CPU 22 uses the scan executing unit 19 to read the image recorded on the paper, and creates the upload data from the image data that was read.

In S571, the CPU 22 sends image processing upload destination URL reception request information and communication format reception request information to the mediation server 60. The "image processing upload" is a process for uploading various data, for image processing, to the conversion server 200. The image processing upload destination URL reception request information is information for requesting an image processing upload destination URL, this being information needed for uploading to the conversion server 200. The communication format reception request information is information for requesting a communication format of an upload message (to be described).

In S572, the CPU 72 of the mediation server 60 determines whether the number of pieces of scan image data to be uploaded from the multi-function peripheral 10 is greater than the required data number. Specifically, when the selected application is the A or C application, it is determined whether the number of pieces of scan image data to be uploaded is greater than one. Further, when the selected application is the B application, it is determined whether the number of pieces of scan image data to be uploaded is greater than the required data number of the selected template images selected in S536. When a positive determination is made (S572: YES), the process proceeds to S574.

In S574, the CPU 72 sends error notification screen data to the multi-function peripheral 10. The error notification screen data is information for causing an error notification screen, this indicating that the number of pieces of scan image data does not comply with the required data number, to be displayed on the display unit 14. In S576, the CPU 22 of the multi-function peripheral 10 causes the error notification screen to be displayed on the display unit 14. For example, "Number of documents read is greater than required number" may be displayed on the error notification screen. Then the flow ends.

On the other hand, when a negative determination is made in S572 (S572: NO), the process proceeds to S577. In S577, the CPU 72 creates a communication format of the upload message. The communication format of the upload message is a template for a message when uploading upload data to the conversion server 200.

In S579, the CPU 72 sends an image processing upload destination URL and the communication format of the upload message to the multi-function peripheral 10. An example of the image processing upload destination URL is the URL of the conversion server 200.

In S581, the CPU 22 creates an upload message based on the received communication format, the received image processing upload destination URL, and the upload data created in S565. Specifically, the multi-function peripheral 10 stores binary data as the upload data, the image processing upload destination URL, and various other information such as the data size of the upload data, at prescribed positions in the communication format received from the mediation server 60. By this means, an upload message suitable for the conversion server 200 can be created.

In S583, the CPU 22 sends the upload message to the conversion server 200. In S585, the CPU 272 of the conversion server 200 sends image processing upload result information to the multi-function peripheral 10. The image processing upload result information is information indicating whether the upload data was normally uploaded to the conversion server 200. In S587, the CPU 22 of the multi-function peripheral 10 sends the received image processing upload result information and continuing capability determination request information to the mediation server 60. The continuing capability determination request information is information for requesting the mediation server 60 to determine whether the image processing can be continued.

In S589, the CPU 72 of the mediation server 60 decodes the image processing upload result information, and creates a decoding result. The image processing upload result information is information sent from the conversion server 200 to the multi-function peripheral 10, and thus has specifications peculiar to the conversion server 200. Hence, by using a decoding program, not shown, included in the program 75 stored by the mediation server 60, the image processing upload result information can be decoded. A decoding result is a message in a format decodable by the multi-function peripheral 10. The decoding result includes an image processing upload result included in the decoded image processing upload result information. Further, based on the decoding result, the CPU 72 creates continuing capability information, which is information about whether image processing can continue.

For example, when the decoding result indicates that an upload process failed, continuing capability information is generated which indicates that image processing can not continue.

In S591, the CPU 72 sends the decoding result and the continuing capability information to the multi-function peripheral 10.

In S593, the CPU 22 of the multi-function peripheral 10 determines whether the image processing can continue based on the continuing capability information. When a negative determination is made (S593: NO), the flow ends, and when a positive determination is made (S593: YES), the process proceeds to S595.

In S595, the CPU 22 of the multi-function peripheral 10 determines whether scan image data exists for which the upload process has not been executed. When a positive determination is made (S595: YES), the process returns to S571, and when a negative determination is made (S595: NO), the process proceeds to S597. In S597, the CPU 22 sends, to the mediation server 60, upload completion notification information indicating that the process of uploading the scan image data to the conversion server 200 is completed.

In S601, the CPU 72 determines whether the number of pieces of scan image data uploaded to the conversion server 200 satisfies the required data number. Specifically, when the selected application is the A or C application, it is determined whether the number of pieces of scan image data which have been uploaded is one. Further, when the selected application is the B application, it is determined whether the number of pieces of scan image data which have been uploaded matches the required data number of the selected template selected in S536. When a negative determination is made (S601: NO), the process proceeds to S603. In S603, the CPU 72 sends the error notification screen data to the multi-function peripheral 10. In S605, the CPU 22 of the multi-function peripheral 10 causes the error notification screen to be displayed on the display unit 14. For example, "Number of documents read do not meet required number" may be displayed on the error notification screen. Then the flow ends.

On the other hand, when a positive determination is made in S601 (S601: YES), the process proceeds to S619. In S619, the CPU 72 sends first image processing request information, a selected application parameter, and a selected template parameter to the conversion server 200. The first image processing request information is information for requesting image processing to be executed on upload data identified by the data ID for image processing upload received in S575 (i.e., the upload data uploaded to the conversion server 200 in S583). The selected application parameter is information for uniquely identifying the selected application selected by the user. By means of the selected application parameter, it is possible to specify the application on which image processing is to be executed. The selected template parameter is information for uniquely identifying the selected template image selected by the user. The selected template parameter may be described by a URL description method.

In S621, the CPU 272 of the conversion server 200 sends processed data reception information to the mediation server 60. The processed data reception information may include an image processing job ID. The image processing job ID is information for identifying image processing which is executed in response to a process (S619) requesting the execution of image processing. The processed data reception information may be described by a URL description method.

In S623, the CPU 272 determines whether the selected template image identified by the selected template parameter is the third template image for the C application. When a positive determination is made (S623: YES), the process proceeds to S624. In S624, the CPU 272 reads the selected template image data from among the third template image data 123 stored in the template storage area 276. Then, the image processing is started using the C application 283. Then, the process proceeds to S631.

On the other hand, when a negative determination is made in S623 (S623: NO), the process proceeds to S625. In S625, the CPU 272 sends template reception request information to the contents server 100. The template reception request information is information for obtaining the selected template image data identified by the selected template parameter from the contents server 100. In S627, the CPU 272 obtains the selected template image data from the contents server 100. Then, the image processing is started using the A application 281 or the B application 282. Then, the process proceeds to S631.

The processes S631 to S651 are processes which, when image processing for uploading data is started, cause the multi-function peripheral 10 to wait until the completion of the aforementioned image processing for the uploading. The conversion server 200 executes the image processing on the upload data in response to the first image processing request information received in S619. The image processing may be executed on each of upload data divided into prescribed data amounts (e.g., 100 KB). Further, the prescribed data amount may be a data amount suitable for image processing.

In S631, the CPU 72 of the mediation server 60 sends image processing completion confirmation request information to the conversion server 200. The image processing completion confirmation request information is information for confirming with the conversion server 200 whether the image processing requested from the conversion server 200 in S619 has been completed. In order to identify the image processing, the CPU 72 includes, in the image processing completion confirmation request information, the processed data reception information sent by the conversion server 200 in S621.

In S632, the CPU of the conversion server 200 determines whether the image processing has been completed. Specifically, the image processing that is to be performed on the processed data reception information included in the image processing completion confirmation request information is specified to be the image processing for determining whether the image processing can be completed. Then, it is determined whether the conversion of a prescribed data amount from a beginning part of the upload data has been completed in the specified image processing. Specifically, in regards to the image processing executed for 100K bytes at a time, it is determined whether this processing of 100K bytes has been completed; and similarly, in regards to the image processing that processes all the upload data, it is determined whether the image processing for all the upload data has been completed. In case the image processing has not been completed (S632: NO), the process proceeds to S633.

In S633, the CPU sends to the mediation server 60 image processing incomplete notification information indicating that conversion processing has not completed. In S635, the CPU 72 of the mediation server 60 generates a wait command in response to the reception of the image processing incomplete notification information. The wait command is a command to cause the multi-function peripheral 10 to wait for the completion of the conversion processing.

In S637, the CPU 72 sends the wait command to the multi-function peripheral 10. In S639, the CPU 22 of the multi-function peripheral 10 executes wait processing to wait for the completion of the image processing. The wait processing may for example be processing in which a timer which had been started to detect a timeout of the image processing is reset and again started. Or, for example, the wait processing may be processing in which the time until timeout of image processing is lengthened by increasing the timeout time stored in memory 24 such that the time until timeout of image processing is extended.

In S641, the CPU 22 sends to the mediation server 60 the wait processing completion information indicating that wait processing execution has completed. Then the process returns to S631.

However, when in S632 it is determined that the image processing has completed (S632: YES), the process proceeds to S651. In S651, the CPU 272 of the conversion server 200 sends to the mediation server 60 the image processing completion notification information indicating that the image processing of a prescribed data amount in the leading portion of the upload data has completed.

The process S753 to S773 is a process for causing the multi-function peripheral 10 to print the processed data that has undergone image processing by the conversion server 200. In S753, the CPU 72 of the mediation server 60 generates processed data reception command information. The processed data reception command information is information notifying the multi-function peripheral 10 that image processing by the image processing module which is last in the image processing sequence has completed a prescribed data amount of the beginning part (S732: YES).

In receiving the processed data reception command information, in S757 the CPU 72 sends the processed data reception command information to the multi-function peripheral 10. The processed data reception command information may be described by a Uniform Resource Locator (referred to as URL) description method. In S759, the CPU 22 of the multi-function peripheral 10 sends download source URL request information and the processed data reception information request information to the mediation server 60. The download source URL request information is information to request of the mediation server 60 a first download source URL to access processed data for which image processing completion confirmation was executed in S631. Further, the processed data reception information request information is information for identifying the job which has generated the processed data for which image processing completion confirmation was executed in S631.

In S761, the CPU 72 generates the first download source URL and the processed data reception information for receiving processed data from the conversion server 200, and sends the first download source URL and the processed data reception information to the multi-function peripheral 10.

In S763, download request information to download the processed data identified by the processed data reception information is sent, based on the first download source URL, to the conversion server 200 by the CPU 22 of the multi-function peripheral 10. In S765, the CPU 272 of the conversion server 200 sends the processed data specified by the download request information to the multi-function peripheral 10.

In the conversion server 200, when the image processing is executed for 100 KB at a time, in S765 the processed data may be sent 100 KB at a time to the multi-function peripheral 10 in response to the download request information sent in S763. In this case, the CPU 22 of the multi-function peripheral 10 may repeat the sending of the download request information of S763, and repeat the receiving of the processed data of S765 until the minimum data amount which can undergo print processing by the print executing unit has been received. The minimum data amount which can undergo print processing by the print executing unit may be an amount sufficient to cause one carriage pass of an ink head in case the print executing unit 18 is an ink jet printer, and an amount sufficient to print one page of printing paper in case the print executing unit 18 is a laser printer.

In S767, the CPU 22 of the multi-function peripheral 10 causes the print executing unit 18 to execute the print process. The print process may be executed using a smallest printable unit of the print data. For example, in case the print executing unit 18 is the ink jet printer, the print process may be executed in units of lines. In case the print executing unit 18 is the laser printer, the print process may be executed in one page units of printing paper.

In S768, the CPU 22 determines whether processed data exists for which the print has not been executed. When a positive determination is made (S768: YES), the process returns to S759, and when a negative determination is made (S768: NO), the process proceeds to S769.

In S769 the CPU 22 sends print completion notification information, indicating that the print process has been completed, to the mediation server 60. In S771, the CPU 72 of the mediation server 60 sends process completion notification information to the multi-function peripheral 10. In S773, the CPU 22 of the multi-function peripheral 10 causes a completion screen to be displayed on the display unit 14. Thus, the flow ends.

Advantages

According to the communication system 2 described in the present specification, it is possible to execute image processing to synthesize the scan image generated by the scan process performed by the multi-function peripheral 10 (S565), and the selected template image selected by the user (S537). Thus, it is possible to execute more versatile image processing than image processing in which only the image format of the scan image is converted, etc.

According to the mediation server 60, etc. described in the present specification, it is possible to cause the display unit 14 of the multi-function peripheral 10 to display the template selection screen 212 (S536). Then, it is possible to cause the user to select the selected template image from among the plurality of template images. Hence, it is possible to synthesize the template image selected by the user and the scan image.

According to the communication system 2 described in the present specification, it is possible to identify the selected application based on the application identification information (S527), and cause the template selection screen 212 to display the template image corresponding to the selected application as an option (S536). For example, when the selected application is the A application, it is possible to cause a thumbnail image of the first template image to be displayed on the template selection screen 212. Further, when the selected application is the B application, it is possible to cause a thumbnail image of the second template image to be displayed on the template selection screen 212. Thus, it is possible to prevent a template image that is not compatible with the selected application from being selected.

According to the communication system 2 described in the present specification, it is possible to cause the multi-function peripheral 10 to display the error notification screen (S576, S605) when the number of pieces of scan image data to be uploaded from the multi-function peripheral 10 is greater than the required data number (S572: YES), or when the number of pieces of scan image data to be uploaded from the multi-function peripheral 10 does not meet the required data number (S601: NO). Thus, it is possible to cause the user to recognize that the reason for being unable to execute image processing is due to the number of pieces of scan image data being greater than the required data number, or due to the number of pieces of scan image data not meeting the required data number. Hence, it is possible to prevent an image unintended by the user from being generated, such as an image in which a part of a plurality of scan images is not included, an image in which a scan image is not placed into an area into which the scan image is to be placed, etc.

According to the communication system 2 described in the present specification, the selected application can be identified based on the application identification information (S527), and a command can be output to cause image processing to be executed on the identified application (S619). Thus, even when there are a plurality of applications, i.e., the A application 281 to the C application 283, it is possible to cause the image processing to be executed by an application suitable for the type of image processing selected by the user.

According to the communication system 2 described in the present specification, the contents server 100, the mediation server 60 and the conversion server 200 are configured as separate entities. Then, it is possible to store the first template image data 121 and the second template image data 122 in the contents server 100, and cause the conversion server 200 to execute image processing. Thus, it is possible to suppress the effects on image processing when editing or maintenance of the first template image data 121, etc. is performed.

According to the communication system 2 described in the present specification, when the selected template image is the third template image for the C application (S623: YES), the selected template image data is read from among the third template image data 123 stored in the template storage area 276 of the conversion server 200 (S624), and the conversion server 200 executes image processing. On the other hand, when the selected template image is the first or the second template image (S623: NO), the selected template image data is obtained from among the first template image data 121 or the second template image data 122 stored in the template storage area 102 of the contents server 100 (S627), and the conversion server 200 executes image processing. Thus, when the selected template image is the third template image, the process for the conversion server 200 to obtain the selected template image data from the contents server 100 can be omitted. Hence, it is possible to reduce the amount of communication between the contents server 100 and the conversion server 200.

According to the communication system 2 described in the present specification, the multi-function peripheral 10 can be caused to execute a print process using processed data (S767) by sending the processed data reception command information from the mediation server 60 to the multi-function peripheral 10 (S757). Then, it is possible to use a URL, this being a protocol that is generally used, in the description method of the processed data reception command information. Thus, it is possible to eliminate the need to provide a dedicated protocol for communication between the mediation server 60 and the multi-function peripheral 10.

In the mediation server 60 described in the present specification, during execution of various processing, the wait command to cause the multi-function peripheral 10 to wait for the completion of the processing can be sent to the multi-function peripheral 10 (S637). Hence the situation in which the timeout or other error occurs in the multi-function peripheral 10 can be prevented.

While specific embodiments of the present invention have been described in detail above, such description is for illustrative purposes only and is not intended to limit the scope and claims of the invention. Techniques described in the claims of the invention include various modifications and changes made to the specific examples illustrated above. Variants according to the above embodiments are listed below.

(First Variant)

A process executed in the first variant is a process executed instead of the processes of S625 and S627. Processing contents of the first variant will be described using the flowchart of FIG. 9.

When a negative determination is made in S623 (S623: NO), the process proceeds to S100. In S100, the CPU 272 of the conversion server 200 determines whether saved template image data, which is the same as the selected template image data identified by the selected template parameter obtained in S619, is being stored the memory 274 of the conversion server 200. Specifically, the memory 274 is searched for whether saved template image data exists which is associated with the same parameter as the selected template parameter which has been obtained. When a negative determination is made (S100: NO), the process proceeds to S105.

In S105, the CPU 272 obtains the selected template image data and a last update date of the selected template image data from the contents server 100. The last update date of the selected template image data is information indicating date and time when an administrator or the like of the contents server 100 last performed a modification, etc. of the selected template image data. In S110, the CPU 272 stores the obtained selected template image data in the memory 274 as the saved template image data. Then, the process proceeds to S150. In S150, the CPU 272 stores, in the memory 274, the selected template parameter, the update date of the selected template image data, and a save path of the saved template image data in association with the saved template image data stored in S110. Then, the process proceeds to S631.

On the other hand, when a positive determination is made in S100 (S100: YES), the process proceeds to S115. In S115, the CPU 272 obtains only the update date of the selected template image data from the contents server 100.

In S120, the CPU 272 determines whether the saved template image data being stored in the memory 274 is the most recent data. The specific method of determination will be described. The CPU 272 reads, from the memory 274, the last update date associated with the saved template image data which is the same as the selected template image data. Then, the CPU 272 determines whether the last update date that was read and the last update date obtained in S115 are matching. It can be determined whether the saved template image data being stored in the memory 274 is the most recent data depending on whether the two are matching.

When a positive determination is made in S120 (S120: YES), the process proceeds to S123. In S123, the CPU 272 reads the saved template image data according to the save path associated with the parameter which is the same as the selected template parameter obtained in S619. Then, the process proceeds to S631.

On the other hand, when a negative determination is made in S120 (S120: NO), the process proceeds to S125. In S125, the CPU 272 obtains the selected template image data from the contents server 100. In S130, the CPU 272 stores the obtained selected template image data in the memory 274 as the saved template image data. At this time, the old saved template image data is overwritten. Then, the process proceeds to S150. Since the process of S150 has already been described, a description thereof is omitted.

The effect of the first variant will be described. In the technique of the first variant, the conversion server 200 can temporarily store the template image data obtained from the contents server 100 in the memory 274 of the conversion server 200 (S110). Then, when the instruction to obtain the selected template image data is received in S619, the selected template image data can be obtained from the memory 274 (S123) if saved template image data which is the same as the selected template image data whose acquisition was instructed is being stored in the memory 274 (S100: YES, S120: YES). In this case, it is not necessary to obtain the selected template image data from the contents server 100.

Thus, the amount of communication between the conversion server 200 and the contents server 100 can be reduced, and consequently it becomes possible to realize high speed image processing.

(Second Variant)

The image data used in the image processing is not limited to scan image data generated by the scan process by the multi-function peripheral 10, and various image data may be used. In the second variant, a case will be described in which stored image data, which is image data stored in advance in the memory 24 of the multi-function peripheral 10, is used in the image processing. Processing contents of the second variant will be described using the sequence diagram of FIG. 10. In FIG. 10, processing contents of steps having the same reference numbers as FIG. 3 have already been described, and consequently a description thereof is omitted.

In S545a, the CPU 72 of the mediation server 60 generates stored image list display screen data for causing the display unit 14 of the multi-function peripheral 10 to display a stored image list display screen. The stored image list display screen is a screen for listing thumbnail images representing each of the stored image data being stored in the memory 24 of the multi-function peripheral 10, and for receiving selection of one or a plurality of stored images. Further, the CPU 72 generates the required data number information based on the template identification information. In S547a, the CPU 72 sends the stored image list display screen data and the required data number information to the multi-function peripheral 10.

In S549a, the CPU 22 of the multi-function peripheral 10 causes the display unit 14 to display the stored image list display screen and the required data number. The display mode of the required data number may be in the manner of e.g., "Please select 00 images". The user operates the operating unit 12 to select, from among the listed thumbnail images, a thumbnail image corresponding to the stored image to be used. Thus, selected stored images in the required data number are selected. In S551a, the CPU 22 sends selected stored image identification information, for identifying one or a plurality of the selected stored images, to the mediation server.

In S553a, the CPU 72 of the mediation server 60 determines whether the number of pieces of stored image data to be uploaded from the multi-function peripheral 10 matches the required data number. When a negative determination is made (S553a: NO), the process proceeds to S555a. In S555a, the CPU 72 sends the error notification screen data to the multi-function peripheral 10. In S557a, the CPU 22 of the multi-function peripheral 10 causes the error notification screen to be displayed on the display unit 14. For example, "Number of images selected does not match required number" may be displayed on the error notification screen. Then the flow ends.

On the other hand, when a positive determination is made in S553a (S553a: YES), the process proceeds to S561a. In S561a, the CPU 72 of the mediation server 60 generates upload execution command information. The upload execution command information is information commanding the multi-function peripheral 10 to upload the selected stored image data to the conversion server 200. In S563a, the CPU 72 sends the upload execution command information to the multi-function peripheral 10. Subsequent steps have already been described, and consequently a description thereof is omitted. According to the process of the second variant, it is possible to execute image processing so as to synthesize various image data with the selected template image data.

(Other Variants)

The process for causing the display unit 14 of the multi-function peripheral 10 to display the error notification screen may be omitted. In this case, S572 to S576 may be omitted, and the process may proceed from S571 to S577. Further, S601 to S605 may be omitted, and the process may proceed from S597 to S619. The third template image data 123 may be stored in the template storage area 102 of the contents server 100. In this case, S623 and S624 may be omitted. Thus, generally speaking, it is sufficient for the relaying device to comprise at least "the receiving of selected image processing identifying information", "the receiving of selected second image information-identifying information", "the receiving of the selected second image information", "the executing of the selected image processing" and "the sending of created image information". As a specific example, it is sufficient for the relaying device to execute at least S525, S537, S619, and S765.

A form was described in which in S529 the CPU 72 of the mediation server 60 requests the template list information from the contents server 100, but the form is not limited to this. There may also be a form in which at least a part of the template list information is retained in the mediation server 60 or the conversion server 200.

As a specific example, the template list information of the first template image data 121 and the second template image data 122 may be retained in the contents server 100, and the template list information of the third template image data 123 may be retained in the conversion server 200. In this case, the CPU 72 of the mediation server 60 may identify the selected application based on the application identification information received in S525 in FIG. 2. Then, when the selected application is the A application 281 or the B application 282, the template list information reception request information may be sent to the contents server 100. Further, when the selected application is the C application 283, the template list information reception request information may be sent to the conversion server 200.

The number of applications that is stored in the conversion server 200 is not limited to the three applications which are the A application 281 to the C application 283. The number of applications may be two or less, or four or more. The number of template images listed in the template selection screen 212 is not limited to the three templates x to z. The number of template images may be two or less, or four or more.

The image processing upload destination URL which the CPU 72 sends to the multi-function peripheral 10 in S579 is not limited to a URL of a conversion server but a URL of a recording medium which the conversion server can access.

In the present embodiment, a case was explained in which contents servers 100 is connected to the Internet 6; but two or more contents servers may be connected to the Internet 6.

In the embodiment, the case is described in which the CPUs 22, 72, and 272 of the multi-function peripheral 10, the mediation server 60, and the conversion server 200 execute processing according to software, but is not limited thereto. At least a part of functions provided according to the software may be provided by hardware such as a logic circuit.

The invention claimed is:
1. A relay device comprising:
a network interface configured to connect with a network;
a processor coupled to the network interface; and
a memory storing computer-readable instructions and one or more processing modules,
wherein, when executed by the processor, the computer-readable instructions cause the relay device to perform:
receiving, via the network interface, selected image processing identifying information from a image processing device which is connected with the network,
the selected image processing identifying information being configured to identify a selected image processing, which is at least one type of image processing selected in the image processing device from among plural types of image processing, and
the plural types of image processing being a processing to be executed on first image information outputted from the image processing device;
receiving selected second image information-identifying information from the image processing device via the network interface,
the selected second image information-identifying information being configured to identify selected second image information selected in the image processing device from among a plurality of second image information, and
the selected second image information being information to be composed with the first image information by the selected image processing;
receiving the selected second image information identified by the selected second image information-identifying information;
executing the selected image processing identified by the selected image processing identifying information to compose the selected second image information and the first image information by using one or more of the processing modules; and
sending created image information to the image processing device via the network interface, the created image information being image information created by the execution of the selected image processing,
wherein in a case where the selected image processing to be executed using the one or more of the processing modules is a first image processing that requires a predetermined number of the first image information, the computer-readable instructions further cause the relay device to perform:
sending second information to the image processing device via the network interface when a number of the first image information to be sent from the image processing device is greater than the predetermined number, or when the number of the first image information to be sent from the image processing device is less than the predetermined number,
the second information being information for causing the image processing device to display, on the display of the image processing device, an image indicating that the number of the first image information does not match the predetermined number.

2. The relay device according to claim 1, wherein the computer-readable instructions further cause the relay device to perform:
sending first information to the image processing device via the network interface,
the first information being information for:
causing the image processing device to display images showing each of the plurality of second image information stored in a first server device, on a display of the image processing device;
receiving an operation to select the selected second image information from among the plurality of second image information;
causing the image processing device to execute the processing to generate the selected second image information-identifying information from among the plurality of second image information-identifying information, and the selected second image information, identified by the selected second image information-identifying information which was outputted from the image processing device, is received from the first server device.

3. The relay device according to claim 1, wherein
the one or more processing modules includes plural types of processing modules, each of the plural types of processing modules being corresponding to each of the plural types of image processing respectively,
a type of the selected image processing is identified based on the selected image processing identifying information received from the image processing device, and
the executing of the selected image processing includes causing the processing module corresponding to the identified type of the selected image processing to execute the selected image processing.

4. The relay device according to claim 1, wherein
the relay device includes:
   the first server device storing the plurality of second image information; and
   a second server device that is configured to connect to the image processing device and the first server device via the network,
the computer-readable instructions causes the second server device to perform:
   the receiving of the selected second image information-identifying information,
   the executing of the selected image processing; and
   receiving, from the first server device, the selected second image information identified by the selected second image information-identifying information received from the image processing device.

5. The relay device according to claim 1, wherein
the computer-readable instructions further cause the relay device to perform:
sending information acquisition instructing information to the image processing device via the network interface when the selected image processing is completed,
   wherein the information acquisition instructing information being an instruction to cause the image processing device to receive the created image information from the relay device, and
the information acquisition instructing information is described in a format of a Uniform Resource Locator.

6. The relay device according to claim 1, wherein
the computer-readable instructions further cause the relay device to perform:
sending a stand-by instruction to wait for a completion of the selected image processing to the image processing device via the network interface while the selected image processing is being executed, and
sending the created image information to the image processing device via the network interface when the selected image processing is completed.

7. A relay device comprising:
a network interface configured to connect with a network;
a processor coupled to the network interface; and
a memory storing computer-readable instructions and one or more processing modules,
wherein, when executed by the processor, the computer-readable instructions cause the relay device to perform:
receiving, via the network interface, selected image processing identifying information from a image processing device which is connected with the network,
   the selected image processing identifying information being configured to identify a selected image processing, which is at least one type of image processing selected in the image processing device from among plural types of image processing, and
   the plural types of image processing being a processing to be executed on first image information outputted from the image processing device;
receiving selected second image information-identifying information from the image processing device via the network interface,
   the selected second image information-identifying information being configured to identify selected second image information selected in the image processing device from among a plurality of second image information, and
   the selected second image information being information to be composed with the first image information by the selected image processing;
receiving the selected second image information identified by the selected second image information-identifying information;
executing the selected image processing identified by the selected image processing identifying information to compose the selected second image information and the first image information by using one or more of the processing modules; and
sending information acquisition instructing information to the image processing device via the network interface when the selected image processing is completed,
   wherein the information acquisition instructing information being an instruction to cause the image processing device to receive created image information from the relay device, the created image information being image information created by the execution of the selected image processing, and
the information acquisition instructing information is described in a format of a Uniform Resource Locator.

8. The relay device according to claim 7, wherein
the computer-readable instructions further cause the relay device to perform:
sending first information to the image processing device via the network interface,
   the first information being information for:
      causing the image processing device to display, images showing each of the plurality of second image information stored in a first server device, on a display of the image processing device;
      receiving an operation to select the selected second image information from among the plurality of second image information; and
      causing the image processing device to execute the processing to generate the selected second image information-identifying information from among the plurality of second image information-identifying information, and
the selected second image information, identified by the selected second image information-identifying information which was outputted from the image processing device, is received from the first server device.

9. The relay device according to claim 7, wherein
the one or more processing modules includes plural types of processing modules, each of the plural types of processing modules being corresponding to each of the plural types of image processing respectively, a type of the selected image processing is identified based on the selected image processing identifying information received from the image processing device, and the executing of the selected image processing includes causing the processing module corresponding to the identified type of the selected image processing to execute the selected image processing.

10. The relay device according to claim 7, wherein the relay device includes:
   the first server device storing the plurality of second image information; and
   a second server device that is configured to connect to the image processing device and the first server device via the network,
the computer-readable instructions causes the second server device to perform:
   the receiving of the selected second image information-identifying information,
   the executing of the selected image processing; and
   receiving, from the first server device, the selected second image information identified by the selected second image information-identifying information received from the image processing device.

11. The relay device according to claim 7, wherein the computer-readable instructions further cause the relay device to perform:
sending a stand-by instruction to wait for a completion of the selected image processing to the image processing device via the network interface while the selected image processing is being executed, and
sending the created image information to the image processing device via the network interface when the selected image processing is completed.

12. A system comprising an image processing device and a relay device,
the image processing device comprising:
   a first network interface configured to connect with a network; and
   a control device coupled to the first network interface,
the relay device comprising:
   a second network interface configured to connect with the network;
   a processor coupled to the second network interface; and
   a memory storing computer-readable instructions and one or more processing modules,
wherein
the control device of the image processing device is configured to perform:
   sending first image information to the relay device via the first network interface;
   sending selected image processing identifying information to the relay device via the first network interface,
      the selected image processing identifying information being configured to identify a selected image processing, which is at least one type of image processing selected in the image processing device from among plural types of image processing, and
      the plural types of image processing being a processing to be executed on the first image information; and
   sending selected second image information-identifying information being configured to identify selected second image information selected in the image processing device from among a plurality of second image information,
      the selected second image information being information to be composed with the first image information by the selected image processing,
the computer-readable instructions, when executed by the processor, cause the relay device to perform:
   receiving the first image information from the image processing device via the second network interface;
   receiving the selected image processing identifying information from the image processing device via the second network interface;
   receiving the selected second image information-identifying information from the image processing device via the second network interface;
   receiving the selected second image information identified by the selected second image information-identifying information;
   executing the selected image processing identified by the selected image processing identifying information to compose the selected second image information and the first image information by using one or more of the processing modules; and
   sending created image information to the image processing device via the second network interface, the created image information being image information created by the execution of the selected image processing,
the control device of the image processing device is further configured to perform receiving the created image information from the relay device via the first network interface,
wherein in a case where the selected image processing to be executed using the one or more of the processing modules is a first image processing that requires a predetermined number of the first image information, the computer-readable instructions further cause the relay device to perform:
sending second information to the image processing device via the network interface when a number of the first image information to be sent from the image processing device is greater than the predetermined number, or when the number of the first image information to be sent from the image processing device is less than the predetermined number,
   the second information being information for causing the image processing device to display, on the display of the image processing device, an image indicating that the number of the first image information does not match the predetermined number.

13. A system comprising an image processing device and a relay device,
the image processing device comprising:
   a first network interface configured to connect with a network; and
   a control device coupled to the first network interface,
the relay device comprising:
   a second network interface configured to connect with the network;
   a processor coupled to the second network interface; and
   a memory storing computer-readable instructions and one or more processing modules,
wherein
the control device of the image processing device is configured to perform:
   sending first image information to the relay device via the first network interface;
   sending selected image processing identifying information to the relay device via the first network interface, the selected image processing identifying information being configured to identify a selected image processing, which is at least one type of image processing selected in the image processing device from among plural types of image processing, and the plural types of image processing being a processing to be executed on the first image information; and sending selected second image information-identifying information being configured to identify selected second image information selected in the image processing device from among a plurality of second image information, the selected second image information being information to be composed with the first image information by the selected image processing, the computer-readable instructions, when executed by the processor, cause the relay device to perform:

receiving the first image information from the image processing device via the second network interface;

receiving the selected image processing identifying information from the image processing device via the second network interface;

receiving the selected second image information-identifying information from the image processing device via the second network interface;

receiving the selected second image information identified by the selected second image information-identifying information;

executing the selected image processing identified by the selected image processing identifying information to compose the selected second image information and the first image information by using one or more of the processing modules; and sending information acquisition instructing information to the image processing device via the second network interface when the selected image processing is completed, wherein the information acquisition instructing information being an instruction to cause the image processing device to receive created image information from the relay device, the created image information being image information created by the execution of the selected image processing, and the information acquisition instructing information is described in a format of a Uniform Resource Locator, the control device of the image processing device is further configured to perform receiving the created image information from the relay device via the first network interface.

14. A image processing device comprising:
a network interface configured to connect with a network;
a processor coupled to the network interface; and
a memory storing computer-readable instructions,
wherein, when executed by the processor, the computer-readable instructions cause the image processing device to perform:

sending, via the network interface, selected image processing identifying information to a relay device which is connected with the network, the selected image processing identifying information being configured to identify a selected image processing, which is at least one type of image processing selected in the image processing device from among plural types of image processing, and the plural types of image processing being a processing to be executed on first image information outputted from the image processing device;

sending selected second image information-identifying information to the relay device via the network interface, the selected second image information-identifying information being configured to identify selected second image information selected in the image processing device from among a plurality of second image information, and the selected second image information being information to be composed with the first image information by the selected image processing;

sending first instruction information for causing the relay device to receive the selected second image information identified by the selected second image information-identifying information;

sending second instruction information for causing the relay device to execute the selected image processing identified by the selected image processing identifying information, the selected image processing being configured to compose the selected second image information and the first image information by using one or more of processing modules stored in the relay device; and receiving created image information from the relay device via the network interface, the created image information being image information created by the execution of the selected image processing, wherein in a case where the selected image processing to be executed using the one or more of the processing modules is a first image processing that requires a predetermined number of the first image information, the computer-readable instructions further cause the image processing device to perform:

receiving second information from the relay device via the network interface when a number of the first image information to be sent to the relay device is greater than the predetermined number, or when the number of the first image information to be sent to the relay device is less than the predetermined number, the second information being information for causing the image processing device to display, on the display of the image processing device, an image indicating that the number of the first image information does not match the predetermined number.

15. The image processing device according to claim 14, wherein
the first image information is generated by scanning a document in the image processing device.

16. The image processing device according to claim 14, wherein
the computer-readable instructions further cause the image processing device to perform:

receiving information acquisition instructing information from the relay device via the network interface when the selected image processing is completed, wherein the information acquisition instructing information being an instruction to cause the image processing device to receive the created image information from the relay device, and the information acquisition instructing information is described in a format of a Uniform Resource Locator.

17. The image processing device according to claim 14, wherein
the computer-readable instructions further cause the image processing device to perform:

receiving a stand-by instruction to wait for a completion of the selected image processing from the relay device via the network interface while the selected image processing is being executed, and receiving the created image information from the relay device via the network interface when the selected image processing is completed.

18. A image processing device comprising:

a network interface configured to connect with a network;

a processor coupled to the network interface; and a memory storing computer-readable instructions, wherein, when executed by the processor, the computer-readable instructions cause the image processing device to perform:

sending, via the network interface, selected image processing identifying information to a relay device which is connected with the network,
- the selected image processing identifying information being configured to identify a selected image processing, which is at least one type of image processing selected in the image processing device from among plural types of image processing, and
- the plural types of image processing being a processing to be executed on first image information outputted from the image processing device;

sending selected second image information-identifying information to the relay device via the network interface,
- the selected second image information-identifying information being configured to identify selected second image information selected in the image processing device from among a plurality of second image information, and
- the selected second image information being information to be composed with the first image information by the selected image processing;

sending first instruction information being information for causing the relay device to receive the selected second image information identified by the selected second image information-identifying information;

sending second instruction information being information for causing the relay device to execute the selected image processing identified by the selected image processing identifying information, the selected image processing being configured to compose the selected second image information and the first image information by using one or more of processing modules; and receiving information acquisition instructing information from the relay device via the network interface when the selected image processing is completed,
- wherein the information acquisition instructing information being an instruction to cause the image processing device to receive the created image information from the relay device, the created image information being image information created by the execution of the selected image processing, and the information acquisition instructing information is described in a format of a Uniform Resource Locator.

19. The image processing device according to claim 18, wherein the first image information is generated by scanning a document in the image processing device.

20. The image processing device according to claim 18, wherein the computer-readable instructions further cause the image processing device to perform:

receiving a stand-by instruction to wait for a completion of the selected image processing from the relay device via the network interface while the selected image processing is being executed, and receiving the created image information from the relay device via the network interface when the selected image processing is completed.

* * * * *